Aug. 21, 1951 T. A. WEISZ 2,565,458
ELECTROSTATIC PRECIPITATOR
Filed Nov. 29, 1947 2 Sheets-Sheet 1

INVENTOR
Thomas A. Weisz
BY Robert J. Palmer
Attorney

Aug. 21, 1951 T. A. WEISZ 2,565,458
ELECTROSTATIC PRECIPITATOR
Filed Nov. 29, 1947 2 Sheets—Sheet 2

INVENTOR
Thomas A. Weisz
BY Robert J. Palmer
Attorney

Patented Aug. 21, 1951

2,565,458

UNITED STATES PATENT OFFICE 2,565,458

ELECTROSTATIC PRECIPITATOR

Thomas A. Weisz, Columbus, Ohio, assignor to Westinghouse Electric Corporation, East Pittsburgh, Pa., a corporation of Pennsylvania Application November 29, 1947, Serial No. 788,823

8 Claims. (Cl. 183—7)

1

This invention relates to electrostatic precipitators for the removal of small foreign particles such as dust, from gases such as air.

A successful electrostatic precipitator for the removal of dust and other small foreign particles from air, is of the type disclosed in the G. W. Penney Patent No. 2,129,783. In such a precipitator, the air to be cleaned passes first through an ionizing chamber in which the foreign particles entrained in the air are given electrostatic charges of one polarity, following which the air passes through a collector chamber containing spaced, parallel collector plates having electric charges opposite in polarity to that of the charged particles, and to which the charged particles are attracted. Some of the foreign particles adhere to the collector plates after the charge is removed therefrom, and after the collected particles have lost their charges, and in the past it has been the practice to clean such plates as by washing them down with a cleaning liquid such as water. Such washing of the plates is not always effective in removing all of the collected particles therefrom, and in many locations it is not convenient to supply the piping and other auxiliaries required in the washing of the plates.

This invention provides a collector cell which is of such inexpensive construction and which can be so easily removed from, and replaced in, a collector chamber of an electrostatic precipitator, that it can economically be discarded after a period of use. In one embodiment of the invention the collector cell is a disposable cell having a plurality of spaced collector plates of flexible cardboard having their collector surfaces coated with an electric conductive material, the cell being collapsible whereby it can be stored and shipped in a small space. The casing of the collector chamber holds the plates of the cell rigidly in place between cooperating metal plates of the conventional type, such metal plates being cantilever supported at one end so as to permit the insertion therebetween from the other end, of the plates of the cell.

An object of the invention is to obviate the necessity for the cleaning of the collector plates of an electronstatic precipitator.

Another object of the invention is to provide a disposable collector cell for the collector chamber of an electrostatic precipitator.

Another object of the invention is to reduce the cost of collector cells for electrostatic precipitators.

Another object of the invention is to provide an electrostatic precipitator adapted to receive a disposable collector cell.

2

The invention will now be described with reference to the drawing, of which:

Figure 3:
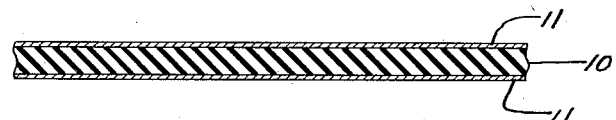
Fig. 3 is an enlarged, fractional view of one of the coated sheets of which the cell may be constructed.
Figure 1:
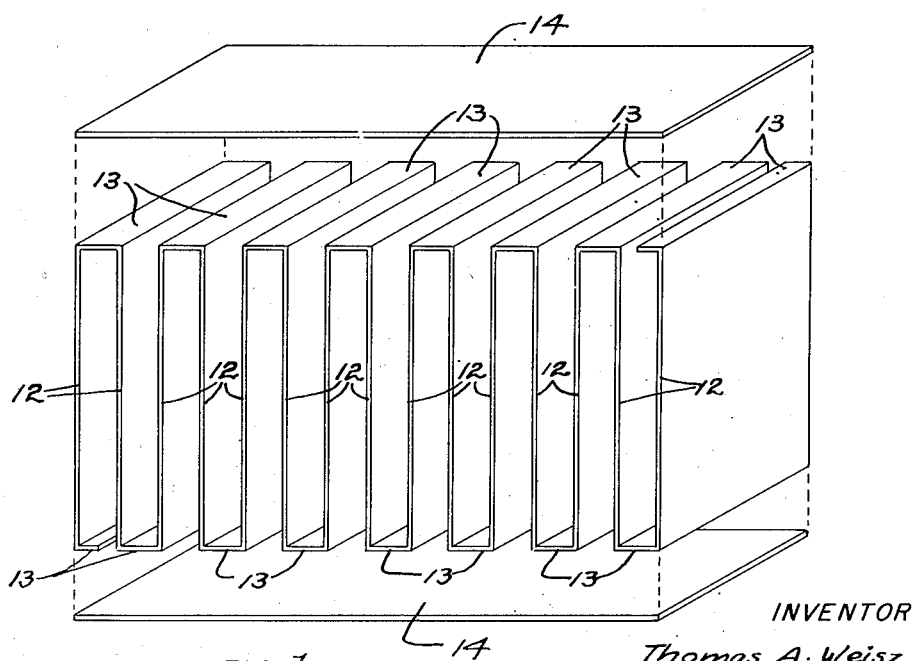
Fig. 1 is a projected, exploded view of a collector cell embodying this invention.
Figure 4:
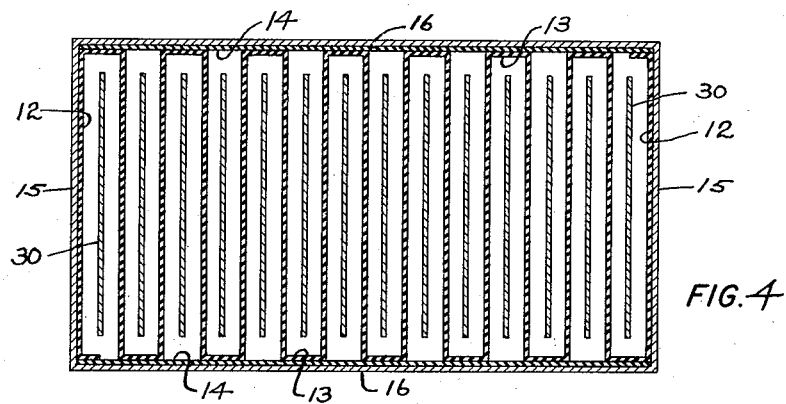
Fig. 4 is a sectional view illustrating the cell in position in the casing of a collector chamber of an electrostatic precipitator.

In constructing the cell illustrated by the drawing, a sheet 10 which may be of cardboard is provided with a metallic surface coating 11 having good electrical conductivity, which coating may be a thin sheet of aluminum foil cemented to the sheet as illustrated by Fig. 3. Such a coated sheet is then folded as illustrated by Fig. 1, so as to have a plurality of equally spaced, parallel walls 12 forming collector plates which extend vertically when the cell is positioned in the precipitator as illustrated by Fig. 4. At the ends of the plates 12, the sheet extends perpendicular to the plates 12, forming the walls 13 which extend horizontally when the cell is in position as illustrated by Fig. 4. The similar sheets 14 which are coated as described in the foregoing are then placed against the walls 13 and cemented thereto forming the upper and lower walls of the cell when it is placed in the precipitator as illustrated by Fig. 4. The outer plates 12 form the end walls of the cell.

The height and the transverse width of the cell formed as described in the foregoing, are so chosen that when the cell is placed in the collector chamber of the precipitator for which it is designed, the outer plates 12 contact the end walls 15 of the metal casing of the collector chamber, and the upper and lower walls 14 of the cell contact the upper and lower walls 16 of the casing of the collector chamber as illustrated by Fig. 4.

Figure 5:
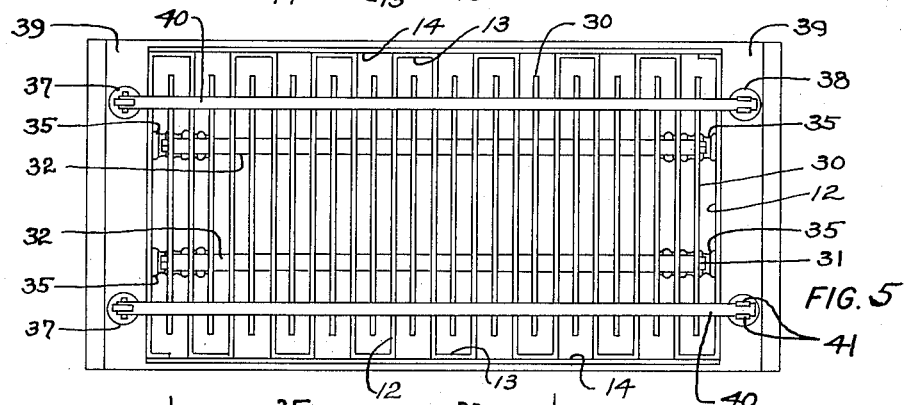
Fig. 5 is an end elevation of the downstream end of an electrostatic precipitator embodying the invention.
Figure 6:
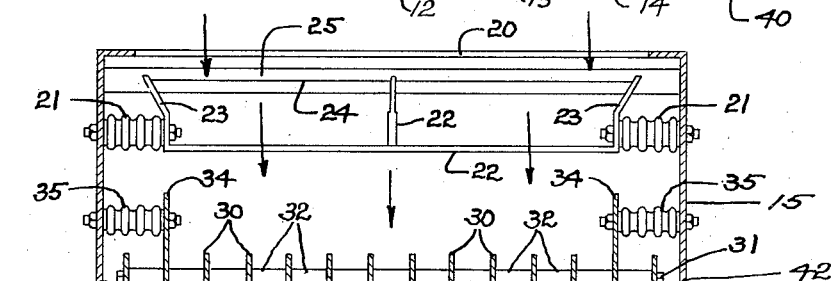
Fig. 6 is a plan view, in section, of the precipitator of Fig. 5.
Figure 6:
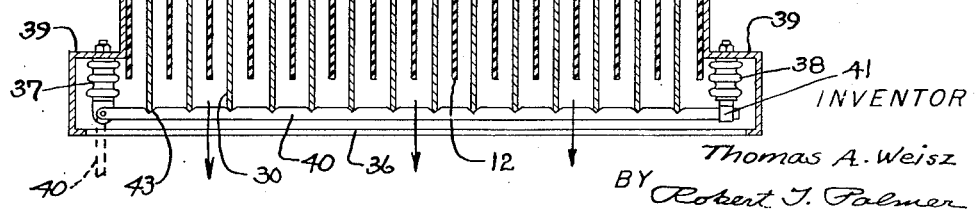

Figs. 4, 5, and 6 illustrate an electrostatic precipitator having a collector chamber designed to receive the collector cell described in the foregoing. The precipitator has an air inlet 20, adjacent which the tubular, electric insulators 21 which are attached to the sides 15 of the precipitator casing, support the ionizer wire supporting frame 22 from which extend the arms 23 which support the ionizer wires 24. The tubular ionizer electrodes 25 extend between the casing sides 15 between, and in alignment with the wires 24. The ionizer electrode assembly described in the foregoing is conventional and a more definite description may be found in the G. W. Penney Patent No. 2,181,767.

The collector chamber of the precipitator contains the metal collector plates 30 which are interconnected mechanically and electrically by the bolts 31 which extend through small circular openings in the plates 30 and which have therearound between adjacent plates, the metal spacers 32 which contact the plates around the apertures therein thereby more tightly securing the plates to the bolts 31.

The second from the end plate 30 adjacent each side 15 of the collector chamber casing, each has the upstream (with respect to air flow as illustrated by the arrows of Fig. 6) extension 34 which is attached to the inner ends of the tubular, electric insulators 35, the other ends of which are attached to the casing sides 15. The insulators 35 thus form a cantilever support for the metal collector plates 30 at their upstream ends. Between the insulators 35 and the downstream ends of the plates 30, the spacers between the plates 30 are free from supports or other obstructions whereby the collector plates 12 of the collector cell described in the foregoing, can be inserted between the plates 30 as will be described.

The downstream end of the precipitator has the air outlet 36 therein. The tubular electric insulators 37 and 38 are attached to the extensions 39 of the casing sides 15 and extend perpendicular thereto, the insulators 37 and 38 being located, as illustrated by Figs. 5 and 6, outside the air passage through the precipitator. The insulators 37 have pivoted thereto the corresponding ends of the bars 40. The insulators 38 have attached thereto the spring clasps 41 which fit around and clasp the other ends of the bars 40 when they are in the closed positions illustrated by Figs. 4, 5, and 6. The bars 40 have the V-shaped slots 43 therein in alignment with the metal collector plates 30, and into the apices of which the downstream ends of the plates 30 fit and are held, when the bars are in the closed positions illustrated by Figs. 5 and 6.

In order to place one of the disposable collector cells having the coated sheet plates 12 in the precipitator, the ends of the bars 40 in the clasps 41 are released from the clasps and the bars are swung outwardly until they extend outside the collector chamber outlet as illustrated by the dashed lines of Fig. 6. The collector cell is then inserted into the precipitator through the air outlet opening 36 and pushed inwardly until the end plates 12 touch the stops 42 which extend inwardly from the casing sides 15. The cell then occupies the position illustrated by Figs. 4, 5, and 6 of the drawing, with the plates 12 equidistant between the metal plates 30, and terminating short of the upstream and downstream ends thereof whereby there is adequate air insulation between upstream and downstream ends of the plates 12 and the spacers 32 and the bars 40 respectively. When the cell has been placed in position as described, the bars 40 are then swung inwardly until their free ends are held by the clasps 41.

Since only the upstream ends of the metal plates 30 are supported by the rods 31, their downstream ends may be displaced out of alignment during the removal and insertion of the collector cells. When this occurs, the unsupported ends of the plates 30 slide along the sides of the V-shaped slots 43 of the bars 40 into the apices thereof when the bars are swung into closed positions, the bars thus providing alignment between, and support for, the plates 30 at their downstream ends.

The ionizer wires 24 are adapted to be connected to a high voltage terminal of a suitable direct current supply source, which terminal may be a +12,000 volt terminal. The metal collector plates 30 which are insulatedly supported from the metal casing of the precipitator, are adapted to be connected to a terminal of the source, which may be a +6,000 volt terminal, and the casing of the precipitator is adapted to be connected to the negative terminal of the source and to ground. The tubular ionizer electrodes 25 are grounded to the casing so that a 12,000 volt potential exists between them and the wires 24 for establishing sufficient electric field for ionizing the air passing between the ionizer electrodes and thereby placing positive electrostatic charges on the foreign particles entrained in the air. The metallic coating on the walls of the cell touches the casing and therefore grounds the collector electrodes 12 thereto so that a difference of potential of 6,000 volts is established between the collector plates 12 and 30 whereby the plates 30 repel and the plates 12 attract the charged foreign particles which upon striking the plates 12 adhere thereto.

When the collector plates 12 become sufficiently dirty to justify their removal, the bars 40 can be swung outwardly, the used cell removed and a new cell inserted. Since the cost of the disposable cells is small, the used ones may be disposed of without any attempt at cleaning.

Figure 2:
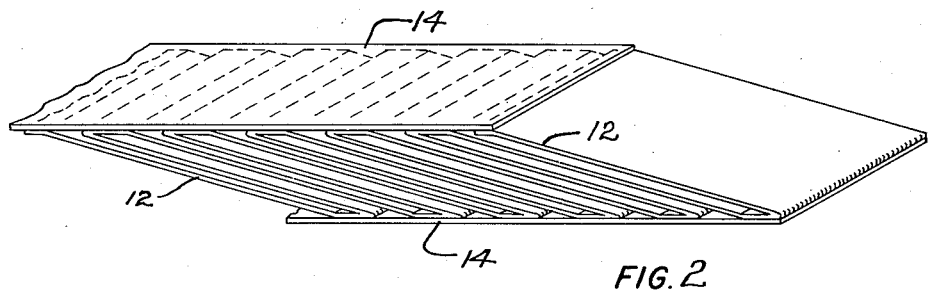
Fig. 2 is a projected view illustrating how the cell can be collapsed for storage or shipment.

Fig. 2 illustrates how a collector cell of the disposable type can be collapsed whereby it will occupy but a small space for shipment or storage. When such a collapsed cell is to be placed in a precipitator, the collapsing pressure is removed so that the plates 12 extend parallel. Then upon insertion into the precipitator, the contact of the casing sides 15 and 16 with the walls of the cell maintain the plates 12 in alignment.

The flexible sheet used for the disposable cell should possess sufficient stiffness so that the plates 12 will not be bowed out of alignment due to the electrostatic field between them and the plates 30. It also is desirable that the cell maintain its dimensions under varying humidities of the air to which it is exposed. This may be accomplished by cementing a metal foil such as aluminum to both sides of a cardboard sheet with a water vapor resistive adhesive.

The cell illustrated by Fig. 1 instead of being of the disposable type described in the foregoing may be of metal in which case the end walls 14 of the cell would be soldered, welded, or brazed to the walls 13.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. A collector chamber for an electrostatic precipitator comprising a metal casing having two pairs of opposed walls, spaced, metal, plate electrodes insulatedly supported from said casing, said electrodes extending substantially parallel to the walls of one of said pairs, a collector cell in said casing, said cell having walls with metallic surfaces in contact with the walls of one of said pair of walls, and having other plate electrodes with metallic surfaces extending between said metal plate electrodes and substantially parallel thereto, the outer of said other electrodes contacting the walls of the other of said pair.

2. A collector chamber as claimed in claim 1 in which the cell is slidably removable from the casing.

3. A collector chamber as claimed in claim 1 in which the metal electrodes are insulatedly supported from the casing at one end of the chamber, and the cell is slidably removable from the opposite end of the chamber.

4. A collector chamber for an electrostatic precipitator comprising a casing having opposed metal walls, a plurality of spaced, metal plate electrodes in said casing and extending substantially parallel to said walls, means insulatedly supporting said electrodes from said casing at one end of the chamber, a collector cell having walls with metallic surfaces in contact with said casing walls, and having plate electrodes with metallic surfaces extending between said metal electrodes and substantially paralled thereto, said cell being slidably removable from the other end of the chamber, and means insulatedly supported from the casing and extending across said other end of said chamber for maintaining the ends of said metal plates at said other end of said chamber in alignment, said last mentioned means being removable from across said other end of said chamber for permitting the removal therefrom of said cell.

5. A collector chamber as claimed in claim 4 in which the last mentioned means includes a bar having V-shaped slots therein for aligning said ends of said metal plates.

6. A collector cell for an electrostatic precipitator comprising a sheet having a metallic surface, said sheet having spaced, aligned portions forming collector plate spacers and supports at opposite sides of the cell, said portions at one side of the cell being parallel those at the other side of the cell, and being off-set so that the ones at one side of the cell are opposite spaces between the ones at the opposite side of the cell, said sheet having spaced, parallel collector plate portions attached at their ends to said first mentioned portions and extending perpendicular thereto, and a pair of transverse sheets attached to said first mentioned portions.

7. A collector cell as claimed in claim 6 in which the sheet is of insulating material having a metallic surface thereon.

8. A collector cell as claimed in claim 7 in which the sheet is flexible, and the cell is collapsible for shipment and storage.

THOMAS A. WEISZ.

REFERENCES CITED

The following references are of record in the file of this patent:

UNITED STATES PATENTS

| Number | Name | Date |
|---|---|---|
| 1,708,065 | Johrdahl | Apr. 9, 1929 |
| 1,798,511 | Wintermute | Mar. 31, 1931 |

FOREIGN PATENTS

| Number | Country | Date |
|---|---|---|
| 349,964 | Germany | Mar. 22, 1922 |
| 60,616 | Sweden | Nov. 27, 1924 |